(No Model.)

J. W. PATTERSON.
RUNNING GEAR FOR VEHICLES.

No. 440,960. Patented Nov. 18, 1890.

WITNESSES:
F. L. Ourand
Jn. L. Coombs

INVENTOR:
John W. Patterson
By James Sagger & Co,
Attorneys

UNITED STATES PATENT OFFICE.

JOHN W. PATTERSON, OF MADISONVILLE, KENTUCKY.

RUNNING-GEAR FOR VEHICLES.

SPECIFICATION forming part of Letters Patent No. 440,960, dated November 18, 1890.

Application filed August 7, 1890. Serial No. 361,247. (No model.)

*To all whom it may concern:*

Be it known that I, JOHN W. PATTERSON, a citizen of the United States, and a resident of Madisonville, in the county of Hopkins and State of Kentucky, have invented certain new and useful Improvements in Running-Gear for Vehicles; and I do hereby declare that the following is a full, clear, and exact description of the invention, which will enable others skilled in the art to which it appertains to make and use the same, reference being had to the accompanying drawings, which form a part of this specification.

My invention relates to improvements in the running-gear of vehicles, and is more especially applicable to buggies and other similar light vehicles.

The object of the invention is to provide such vehicles with running-gear which will be simple and economical in construction and effective in use, by which the strain is taken from the axles by means of improved devices which possess superior advantages to other such devices now in use.

The invention consists in the novel construction and combination of parts hereinafter fully described, and specifically pointed out in the claim.

Figure 1:
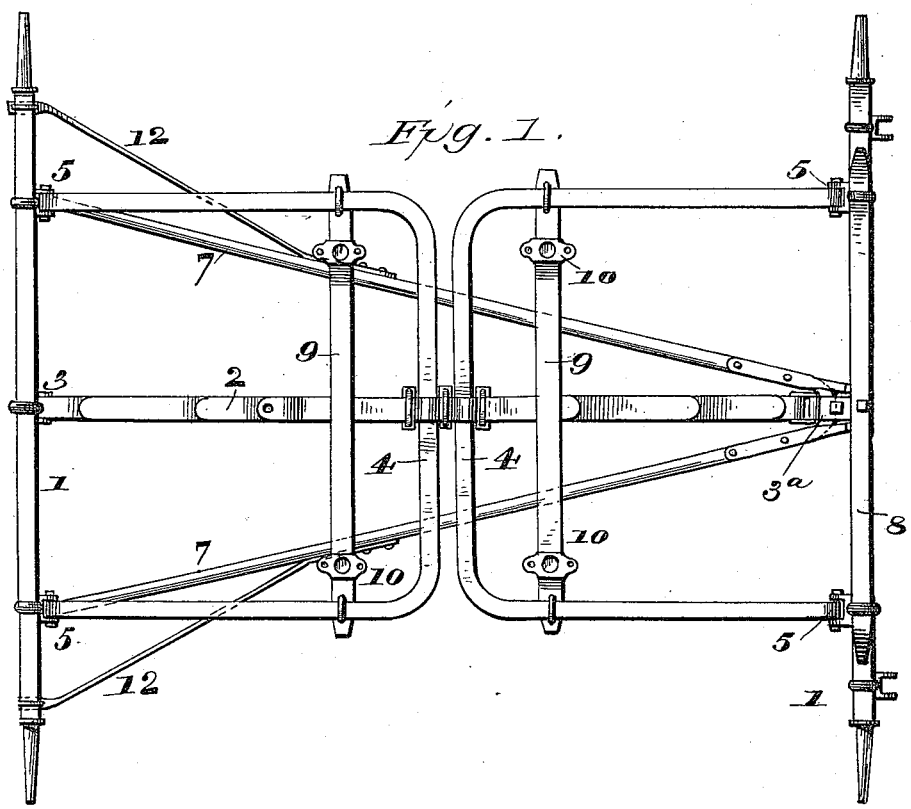
Figure 2:
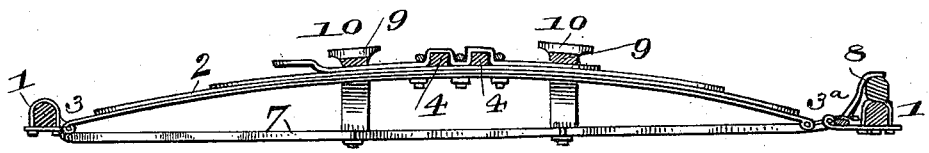

In the accompanying drawings, illustrating the invention, Figure 1 is a plan view of the running-gear of a vehicle constructed in accordance with my invention. Fig. 2 is a central longitudinal section of the same.

In the said drawings, the reference-numeral 1 designates the axles, which may be of any ordinary or suitable construction, while the numeral 2 denotes a spring, which is what is termed a "leaf-spring," being composed of a number of steel plates, which gradually decrease in length. This spring is centrally secured to the rear axle by means of a loose clip or loop 3, while its forward end is attached to a rearwardly-projecting tongue 3ª, secured to the front axle by means of a loop similar to loop 3.

The numeral 4 designates two U-shaped springs of suitable material, the ends of which are formed with eyes 5, which loosely embrace the head-block and rear axles. These springs extend inwardly from the axles to near the center of the vehicle, where they are rigidly attached to the spring 2 by means of box-loops and clips 6.

The numeral 7 designates two reach-bars rigidly secured to the hind axle and extending diagonally forward, where its front ends are rigidly secured to the tongue 3ª. Instead of these bars being made separate, they may be made of a single piece of metal bent at the center and passed through an eye in said tongue, the rear ends being secured, of course, to the hind axle, the same as if made double.

The numeral 8 denotes a head-bar, to which the front spring is attached, and 9 9 are two transverse rods secured to the springs 4 and provided with shoes 10, to which the vehicle-body is to be secured.

12 12 designate brace-rods secured to the hind axle and the reach-bar, respectively.

From the above description it will be seen that the spring 2 is hung to the axles by a swinging loop, which will allow it to give without any strain being communicated to the other parts, the axles being held rigid by means of the reach-bars, thus providing, in connection with the other parts, a very effective and superior running-gear for light vehicles.

Instead of the spring 2 and the reach-bars being secured at the front ends to the tongue 3ª, it is obvious that they may be secured directly to the axles without departure from the invention.

Having thus described my invention, what I claim is—

In a running-gear for vehicles, the combination, with the axles and the central spring loosely connected therewith, of the inwardly-projecting springs loosely secured to the axles and to the central spring and provided with transverse bars, to which the vehicle-body is secured, and the diagonal reach-bars rigidly connected with the axles, substantially as described.

In testimony that I claim the foregoing as my own I have hereunto affixed my signature in presence of two witnesses.

JOHN W. PATTERSON.

Witnesses:
SAM D. LANGLEY,
EDGAR B. MCEUEN.